United States Patent
Pyle

[11] 3,783,889
[45] Jan. 8, 1974

[54] CONDENSATE VALVE
[75] Inventor: Kenneth E. Pyle, Marine City, Mich.
[73] Assignee: Reef-Baker Corporation, East Detroit, Mich.
[22] Filed: June 15, 1972
[21] Appl. No.: 263,093

Related U.S. Application Data
[63] Continuation-in-part of Ser. No. 31,649, April 24, 1970, Pat. No. 3,682,194.

[52] U.S. Cl. ............................................. 137/204
[51] Int. Cl. .............................................. F16t 1/00
[58] Field of Search ............... 137/204, 203, 625.66, 137/625.27, 625.5, 596.18; 251/61.2, 61.3, 61.4, 61.5

[56] References Cited
UNITED STATES PATENTS

| | | | |
|---|---|---|---|
| 2,739,605 | 3/1956 | Smith | 137/204 |
| 2,509,880 | 5/1950 | Pelton | 137/624.21 X |
| 2,810,393 | 10/1957 | Fites | 137/204 |
| 2,441,301 | 5/1948 | Waag | 251/61.5 X |
| 3,004,549 | 10/1961 | Temple | 137/204 |
| 2,591,432 | 4/1952 | Hoerner | 137/204 X |
| 3,575,199 | 4/1971 | Beattie | 137/203 |

*Primary Examiner*—Alan Cohan
*Attorney*—William H. Griffith

[57] ABSTRACT

A condensate valve comprising a housing having a chamber for the accumulation of liquid, and a double-acting valve member for closing an outlet passage from the chamber. The valve member comprises a stem having a rod extending through the passage and also comprises a tubular member sleeved on the rod which is of polygonal cross section to guide the reciprocatory movement of the valve member in the passage while providing clearnace for the flow of liquid. Sealing members are sleeved on the rod at opposite ends of the tubular member. The sealing members and tubular member are held assembled on the rod by a nut. A manually operable device is provided for holding the valve member in a shut-off position and for holding it in an intermediate position for draining the condensate valve.

1 Claim, 2 Drawing Figures

CONDENSATE VALVE

SUMMARY OF THE INVENTION

This application is a continuation-in-part of my application Ser. No. 31,649, filed Apr. 24, 1970, now U.S. Pat. No. 3,682,194, and discloses an improvement on the valve in such application.

The condensate valve of this invention has a new and improved valve stem with replaceable bibbs or sealing members and with a guide of polygonal cross section for guiding the reciprocatory movement of the stem.

The valve of this invention is designed to eliminate or greatly reduce the possibility of disphragm rupture by the use of cupped washers and a contoured body to support the diaphragm.

The valve has a center flow inlet to the pressure side of the diaphragm to balance the force thereon, and has a manual drain and shutoff device which is operable to either drain the tank served by the condensate valve or to shut off the condensate valve.

Other objects and features of the invention will become more apparent as the description proceeds especially when taken in conjunction with the accompanying drawing wherein.

Figure 1:
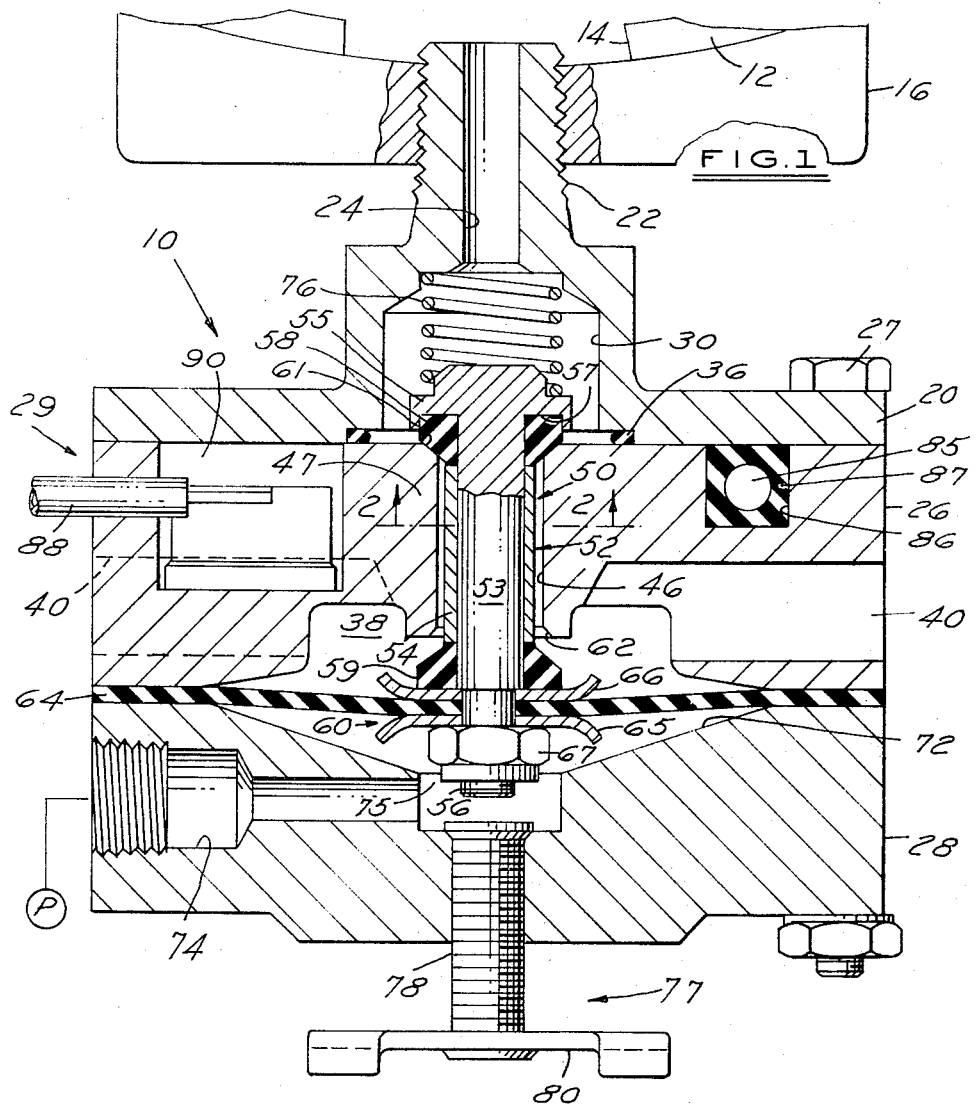
FIG. 1 is a central sectional view of a condensate valve constructed in accordance with my invention shown connected to an air or gas supply tank.
Figure 2:
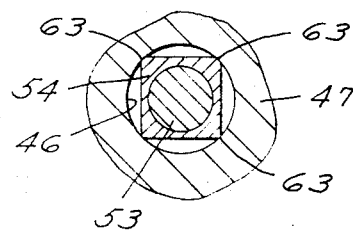
FIG. 2 is a fragmentary sectional view taken on the line 2—2 of FIG. 1.

The condensate or drain valve is shown connected to an air or gas supply tank to remove condensate therefrom. The tank may, for example, be of the type used on vehicles to provide a supply of compressed air for operating the brakes. However, it should be understood that the condensate valve is useful in connection with other types of tanks and for other purposes whether or not the tank contains air or gas and whether or not the pressure in the tank is maintained above atmospheric pressure.

Referring now more particularly to the drawing, the valve is generally designated 10 and is shown as being screw threaded into an opening in the bottom of the tank 12 which may be adapted to contain a supply of air or gas to be used for diversified purposes, which supply of air or gas is preferably under a pressure above atmospheric pressure. Specifically, the bottom wall of the tank has an opening 14 over which is secured the internally threaded member 16. The cap 20 of the condensate valve 10 has a vertically upwardly extending tubular stem 22 which threads through the member 16 into the opening in tank 12. Thus condensate in tank 12 may drain into the condensate valve through the open-ended vertical passage 24 in stem 22 of cap 20.

The condensate valve 10 as already stated has a cap 20, and also has an upper body 26 and a lower body 28 which are bolted together as by nut and bolt assemblies 27. Essentially, the cap 20 and upper and lower bodies 26 and 28 make up the housing of the valve which is designated 29.

A cavity defining a liquid accumulation chamber 30 is formed centrally in the lower surface of the cap 20, in communication with the passage 24. An annular O-ring seal 36 is disposed in an annular groove formed in the bottom surface of cap 20 around chamber 30 to seal against the upper surface of upper body 26 around the periphery of the chamber.

An outlet is provided for exhausting liquid from chamber 30, such outlet including a central chamber 38 formed in the lower portion of body 26 which leads to passages 40 which may open into the atmosphere or which may lead to suitable outlet conduits. A vertical passage 46 of uniform circular cross section throughout its length extends through the central partition portion 47 of the body 26 from the liquid accumulation chamber 30 to the chamber 38.

A vertically reciprocable double-acting valve member 50 extends through passage 46. The valve member 50 has an elongated vertical stem 52 which includes a rod 53 and a tubular member or guide 54. The rod 53 is an elongated member of uniform circular cross section throughout most of its length having an integral head 55 at its upper end and terminating in a lower end portion 56 of reduced cross section. The underside of the head 55 has an annular recess 57. An annular upper bibb or sealing member 58 sleeved on the rod 53 has its upper portion received in the recess 58 and is held in contact with the head by the guide 54. A lower annular bibb or sealing member 59 is sleeved on the rod 53 and held in contact with the lower end of guide 54 by a retainer assembly 60 more fully described hereinafter. Bibb 58 is in chamber 30 and bibb 59 is in chamber 38.

The guide 54 has an inner wall of uniform circular cross section dimensioned to fit snugly yet slidably upon the rod 53. The outer surface of the guide 54 is of non-circular cross section, preferably of uniform polygonal cross section throughout its length and in the present instance it is shown as being of square cross section throughout its length. An imaginary cylinder circumscribing the guide 54 has a diameter the same as the passage 46 so that in use the four corners 63 of the guide engage the wall of the passage 46 and guide the reciprocatory movement of the valve member 50. The clearance or space provided between the sides of the guide 54 and the wall of passage 46 permits liquid to flow through the passage when the valve member is in an intermediate position between its upper and lower limits.

It will be apparent that when the valve member 50 is at the lower limit of its movement, as shown in FIG. 1, the sealing member 58 engages the seat 61 formed on partition 47 of body 26 around the upper end of passage 46 to prevent the outflow of liquid from the accumulation chamber 30, and that in the upper limit of the valve member the sealing member 59 engages the valve seat 62 on partition 47 of the body 26 surrounding the lower end of passage 46 likewise to close the accumulation chamber 30 and prevent the outflow of liquid. However, in intermediate positions of the valve member 50, liquid collected in the accumulation chamber 30 may pass through the space between the sides of the guide 54 and the passage 46 to be discharged through the chamber 38 and passages 40.

The lower boundary of the chamber 38 of the upper body 26 is defined by a flexible diaphragm 64 which is clamped between the upper and lower bodies 26 and 28 of housing 29. The reduced lower end portion 56 of the valve rod 53 extends through the diaphragm 64. The retainer 60 comprises the cupped washers 65, 66 sleeved on the reduced lower end portion 56 of rod 52 on opposite sides of the diaphragm, and the nut 67 threaded on the end portion 56. Washer 66 bears against the shoulder separating the reduced end portion 56 of rod 53 from the main portion thereof. The diaphragm is thus clamped to the end portion 56 of the valve rod between the washers, and the sealing members 58, 59 and guide 54 are held assembled on the rod 53 between the upper washer 66 and the valve head 55. The cupped washers 65, 66 flare away from the diaphragm at their peripheries to reduce or eliminate the possibility of rupture of the diaphragm when it flexes.

A pressure chamber 72 is formed in the upper surface of the lower body 28 and is cone-shaped or slightly dished as shown in the drawing to prevent rupture of the diaphragm. The upper boundary of the pressure chamber 72 is defined by the diaphragm 64. A pressure inlet passage 74 leads to the pressure chamber 72 and communicates therewith centrally thereof through a center flow inlet 75 so that a balanced force is applied centrally to the diaphragm when a suitable pressure source designated P is activated.

A compression coil spring 76 is provided in accumlation chamber 30, bearing against the top wall of the accumulation chamber and against the head 55 of the valve member 50. The spring 76 urges the valve member 50 in a downward direction and moves it to the lower limit illustrated in FIG. 1 when pressure is relieved in pressure chamber 72.

A manual shutoff and drain device 77 is provided. Such device comprises a vertical threaded rod or screw 78 which threads up through a central passage in the lower body 28 into the central flow inlet 75 directly beneath and in line with the lower end of valve member 50. Handle 80 is secured to the lower end of the screw 78. The screw is shown in retracted or withdrawn position in FIG. 1, but may be manually advanced into contact with the lower end of the valve member 50 to lift it to an intermediate position between its upper and lower limits to unseat both valve members 58, 59 and allow the tank 12 to be drained. It may be desirable, in the event that a large amount of moisture has accumulated in the tank, to manually drain the tank in this manner. When further advanced, the screw 78 will lift the valve member 50 to its upper limit causing the sealing member 59 to seal against seat 62 and shut off the condensate valve.

Heating elements 85 may be disposed in an annular space 86 in the upper body 26, being surrounded by the insulating material 87. External wiring 88 is connected to the heating elements 85 and the thermostat 90. The heating elements are provided to heat the condensate valve when necessary to prevent the formation of ice in chamber 30. The thermostat is incorporated in the system to operate the heating elements in response to a predetermined low temperature.

In use, the condensate valve 10 will be connected to the tank 12 as shown in the drawing. If this valve is used in connection with the air brake system of a vehicle, the line connected to the brake system may also direct pressure into chamber 72 of the condensate valve to raise the valve member 50 against the force of spring 76 from the position shown in the drawing to its upper limit in which the sealing member 59 closes on the seat 62 whenever the brakes are applied. Then when the brakes are released, the pressure in the pressure chamber 72 will be relieved and the spring 76 will return the valve member 50 to its lower limit causing sealing member 58 to close on seat 61 and again close the liquid chamber 30. While the valve member 50 is between its limits, that is during the time it is moving from one limit to the other, liquid in the accumulation chamber 30 will be discharged through the passage 46, chamber 38 and passages 40. If there is pressure above atmospheric in the tank 12 this pressure will serve to blow out the accumulated liquid in chamber 30.

In some instances, the condensate valve 10 may be used with a tank whose pressure is maintained by an air compressor which has a regulating or unloading device to operate a relief valve when the regulated pressure in the tank has been reached. Air from the unloading device would then be piped to the pressure chamber 72 of the condensate valve to raise valve member 50 to its upper limit. Then when the tank pressure drops below the regulated air pressure, the air from the compressor would no longer be directed to the pressure chamber 72 in the condensate valve but would be delivered to the tank to build up its pressure again. Hence the pressure in the chamber 72 would be relieved so that the valve member 50 might return by spring pressure to the illustrated position.

It should be noted that the valve member 50 operates twice each time air under pressure is intermittently applied to the pressure chamber 72, once when the air pressure is initially supplied to the chamber and a second time when it is relieved. During each such interval of movement of the valve member 50, liquid in the chamber 30 is relieved.

What I claim as my invention is:

1. A condensate valve comprising a housing, a liquid chamber in the upper portion of said housing for the accumulation of liquid, a liquid inlet to said liquid chamber, a second chamber in said housing beneath said liquid chamber having an outlet port, said housing having a partition separating said chambers, a passage extending downward through said partition from said liquid chamber to said second chamber, an elongated upright valve member vertically reciprocable in said passage, said valve member having a head disposed in said liquid chamber and a stem extending downwardly from said head through said passage, said stem comprising a rod integral with said head terminating at its lower end in said second chamber and also comprising a tubular member sleeved on said rod, the outer surface of said tubular member being of polygonal form and contacting said passage at the corners of the polygon to guide the movement of said valve member, a sealing member sleeved on said rod between said head and said tubular member and disposed in said liquid chamber, a second sealing member sleeved on said rod below said tubular member and disposed in said second chamber, said partition having valve seats at opposite ends of said passage, a removable retainer on the lower end portion of said rod retaining said sealing members and said tubular member sleeved thereon, said sealing members and said tubular member being replaceable upon removal of said retainer, said sealing members being engageable with said valve seats at the opposite limits of vertical movement of said valve member to close said passage against the flow of liquid from said liquid chamber, said tubular member and passage providing clearance to allow liquid to pass from said liquid chamber to said second chamber when said valve member is between its opposite limits, a flexible diaphragm defining the bottom of said second chamber, a pressure chamber in said housing beneath and separated from said second chamber by said diaphragm, the lower end portion of said valve member being connected to said diaphragm by said retainer, said retainer comprising washers sleeved on said rod at opposite sides of said diaphragm and a nut threaded on the bottom of said rod, said housing being composed of separate upper and lower bodies and a cap, said diaphragm being peripherally clamped between said upper and lower bodies, said upper body including said partition, said cap containing said liquid chamber and said liquid inlet, said upper body having said outlet port, a pressure passage in said lower body leading to said pressure chamber centrally thereof, means removably securing said upper and lower bodies and said cap together, said valve member being movable to its upper limit by pressure in said pressure chamber, spring means for moving said valve member to its lower limit when the pressure in said pressure chamber is relieved, and manually operable means in the form of an axially adjustable threaded member for holding said valve member at its upper limit to shut off said condensate valve and for holding said valve member between its opposite limits to drain said condensate valve.

* * * * *